United States Patent
McGrew (10) Patent No.: US 8,855,301 B2
(45) Date of Patent: Oct. 7, 2014

(54) COORDINATING COMPRESSION INFORMATION FOR UNRELIABLE ENCRYPTED STREAMS THROUGH KEY ESTABLISHMENT PROTOCOLS

(75) Inventor: David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/136,860

(22) Filed: Aug. 12, 2011

(65) Prior Publication Data

US 2013/0039487 A1 Feb. 14, 2013

(51) Int. Cl.
*H04L 29/00* (2006.01)
*H04L 29/06* (2006.01)

(52) U.S. Cl.
CPC ............. *H04L 69/04* (2013.01); *H04L 63/166* (2013.01); *H04L 63/061* (2013.01); *H04L 63/0435* (2013.01)
USPC ................. 380/44; 726/24; 713/168; 380/28

(58) Field of Classification Search
USPC .......................... 726/24; 713/168; 380/28, 44
See application file for complete search history.

(56) References Cited

U.S. PATENT DOCUMENTS

| | | | |
|---|---|---|---|
| 5,953,503 A | 9/1999 | Mitzenmacher et al. | |
| 7,203,834 B1* | 4/2007 | Benayoun et al. | ............ 713/168 |
| 7,426,636 B1 | 9/2008 | McGrew et al. | |
| 7,509,491 B1 | 3/2009 | Wainner et al. | |
| 2010/0169645 A1 | 7/2010 | McGrew et al. | |

OTHER PUBLICATIONS

T. Dierke et al., "The TLS Protocol", IEEE Network Working Group RFC 2246, Jan. 1999.
A. Shackam et al., "IP Payload Compression Protocol (IPComp)", Network Working Group RFC 3173, Sep. 2001.
T. Dierke et al., "The TLS Protocol", IETF Network Working Group RFC 4346, Apr. 2006.
E. Rescorla, "Datagram Transport Layer Security", IETF Network Working Group RFC 4347, Apr. 2006.
A. Shacham et al., IP Payload Compression Protocol (IPComp), IETF Network Working Group RFC 3173, Sep. 2001.

* cited by examiner

*Primary Examiner* — Brandon Hoffman
*Assistant Examiner* — Michael D Anderson
(74) *Attorney, Agent, or Firm* — Cindy Kaplan (57) ABSTRACT

In one embodiment, a method includes transmitting compression information from a sender node to a receiver node in a key establishment protocol exchange and transmitting an encrypted compressed packet from the sender node to the receiver node using an unreliable transport. The compression information is used by the receiver node in decompressing the packet received from the sender node. An apparatus is also disclosed.

18 Claims, 6 Drawing Sheets

COORDINATING COMPRESSION INFORMATION FOR UNRELIABLE ENCRYPTED STREAMS THROUGH KEY ESTABLISHMENT PROTOCOLS

TECHNICAL FIELD

The present disclosure relates generally to communication networks, and more particularly, to data compression.

BACKGROUND

Transport Layer Security (TLS) is a cryptographic protocol that provides communication security over the Internet. The TLS protocol includes the capability of running a compression algorithm prior to encryption on the sender side and running the corresponding decompression algorithm after decryption on the receiver side. Compression is not important in every scenario, but it is useful for constrained bandwidth links such as 3G/4G wireless communication. Datagram Transport Layer Security (DTLS) is a datagram version of TLS. The User Datagram Protocol (UDP) provides very few error recovery services, offering instead a direct way to send and receive datagrams over an IP network. UDP is therefore referred to as an unreliable transport. The compression used by TLS cannot be applied to DTLS since it does not use a reliable transport to ensure the delivery of application datagrams that are protected by DTLS, and therefore, packet loss or reorder can interfere with proper operation of the decompressor.

Internet Protocol Security (IPsec) is a protocol for securing Internet Protocol (IP) communications by authenticating and encrypting each IP packet of a communication session. IPsec provides stateless compression in which each packet is independently compressed. However, this method is inefficient because individual packets do not contain very much redundancy.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises transmitting compression information from a sender node to a receiver node in a key establishment protocol exchange and transmitting an encrypted compressed packet from the sender node to the receiver node using an unreliable transport. The compression information is used by the receiver node in decompressing the packet received from the sender node.

In another embodiment, an apparatus generally comprises a processor for transmitting compression information from a sender node to a receiver node in a key establishment protocol exchange and transmitting an encrypted compressed packet from the sender node to the receiver node using an unreliable transport. The apparatus further includes memory for storing the compression information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Transport Layer Security (TLS) is a protocol that provides privacy and data integrity between applications communicating over the Internet. The TLS protocol is made up of two layers; TLS record protocol and TLS handshake protocol. The TLS record protocol is layered on top of a reliable transport protocol, such as TCP (Transmission Control Protocol). The TLS handshake protocol allows authentication between two nodes and the negotiation of an encryption algorithm and cryptographic keys before the application protocol transmits or receives any data. Datagram TLS (DTLS) is a protocol based on TLS that is capable of securing datagram transport (e.g., User Datagram Protocol (UDP)). DTLS is well suited for securing applications that are delay sensitive (and hence use datagram transport) and tunneling applications (Virtual Private Networks (VPNs)).

TLS includes an efficient mechanism for applying compression to plaintext data streams before encryption. DTLS does not have a compression algorithm. The problem with using a stateful compression algorithm over DTLS is that the transport is unreliable (packets get lost and reordered), and therefore the decompression algorithm will not be robust if the compression is performed over the data stream, as is done in TLS. If compression is applied on individual packet records, decompression will be robust against packet loss and reorder, but it will not be effective at compressing packets, because each individual packet typically has a small amount of redundancy, whereas there is more redundancy across multiple packets.

Internet Protocol Security (IPsec) is a protocol suite for securing IP communications by authenticating and encrypting each IP packet of a communication session. The IPsec architecture includes stateless compression (IPComp (IP payload compression)). IPComp is a protocol used to reduce the size of IP datagrams. Each IP datagram is compressed and decompressed by itself without any relation to other datagrams, as IP datagrams may arrive out of order or not arrive at all. Since individual packets do not contain very much redundancy, this method is inefficient.

The embodiments described herein provide an efficient compression mechanism for use with unreliable encrypted data streams (e.g., traffic protected by DTLS, IPsec, or similar protocols). As described below, key establishment (management) protocols (e.g., the DTLS handshake, Internet Key Exchange (IKE)) are used to coordinate compression information between peer nodes. The key establishment protocols may be used, for example, to establish and maintain a compression dictionary. One or more of the embodiments allow the compression algorithm to be stateless in that it does not hold state between packets, while having the compression algorithm use a dictionary that represents the particular flows that are being compressed within the communication session.

Figure 1:
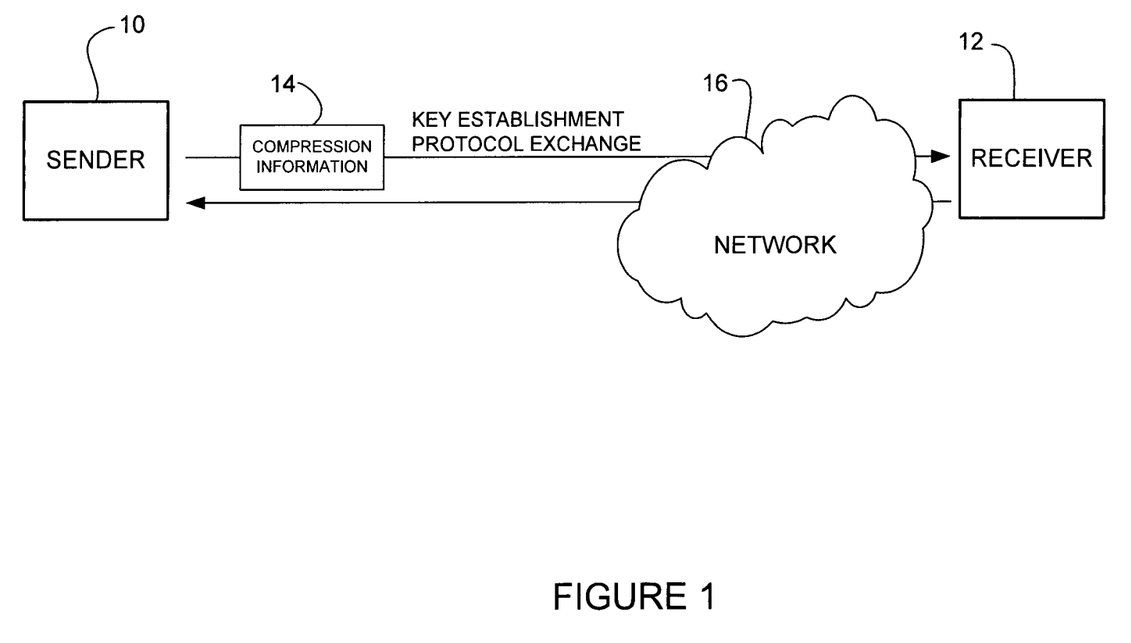
FIG. 1 illustrates an example of a network in which embodiments described herein may be implemented.

Referring now to the figures, and first to FIG. 1, an example of a simplified network in which embodiments described herein may be implemented is shown. A sender (source, client) node 10 is in communication with a receiver (destination, server) node 12 over network 16. It is to be understood that the sender may also operate as a receiver, and the receiver operate as a sender. The network devices 10, 12 may include client/server applications that communicate across network 16. The network devices 10, 12 may be, for example, a personal computer, server, host, mobile device (e.g., smart phone or laptop using AnyConnect or other mobile client), Integrated Services Router (ISR) (e.g., ISR for VPN over 3G/4G wireless), gateway, network device running a VPN (Virtual Private Network) client, or any other network device operable to transmit and receive encrypted data and compress and decompress data. The nodes 10, 12 may be configured, for example, for use with AnyConnect "SSL (Secure Sockets Layer)" VPN or with CAPWAP (Control and Provisioning of Wireless Access Points) protocol. The data transmitted between the network devices 10, 12 may be encrypted, compressed, or encoded according to any format.

Data flow paths between the nodes 10, 12 may include any number or type of intermediate nodes (e.g., routers, switches, gateways, access points, or other network devices) and communication links, which facilitate passage of data between the nodes. The network 16 may include one or more networks (e.g., local area network, metropolitan area network, wide area network, enterprise network, Internet, intranet, radio access network, public switched network, or any other network). The network 16 may be a relatively untrusted network, therefore, encryption is desired to provide secure communications through the network.

As described in detail below, the network devices 10, 12 are configured to coordinate compression information for encryption protocols with unreliable transport by using a key establishment protocol associated with the encryption protocol. As shown in FIG. 1, a key establishment protocol exchange is used to transfer compression information 14 that may be used to compress and decompress data. The receiver 12 preferably acknowledges receipt of the compression information 14 using the key establishment protocol. The key establishment protocol exchange may comprise a DTLS handshake or Internet Key Exchange (IKE), for example.

The DTLS handshake allows for authentication between the nodes and the negotiation of an encryption algorithm and cryptographic keys before the application protocol transmits or receives data. During the negotiation phase, the client sends a ClientHello message and the server responds with a ServerHello message. The client and server then exchange ChangeCipeherSpec messages. The handshake is complete at the application phase in which the application protocol is enabled.

Encapsulating Security Payload (ESP) is a member of the IPsec protocol and provides for encryption of IP datagrams. IPsec uses Internet Key Exchange (IKE) for the establishment of keying material and other traffic security parameters. IKE is used to set up a security association (SA) in the IPsec protocol suite. The security association is a bundle of algorithms and parameters (such as keys) that are used to encrypt and authenticate a particular flow. IKE uses two phases to establish a key between peers. In the first phase, a secure authenticated communication is established using a key exchange algorithm to generate a shared secret key to encrypt further IKE communications. During phase two, the IKE peers use the secure channel established in the first phase to negotiate security associations on behalf of other services such as IPsec.

It is to be understood that the network shown in FIG. 1 and the protocols described herein are only examples and that the embodiments may be implemented in networks having different network topologies or network devices, or utilizing different protocols, without departing from the scope of the embodiments. For example, encryption or key establishment protocols other than DTLS, IPsec (ESP, IKE) may be used without departing from the scope of the embodiments.

Figure 2:
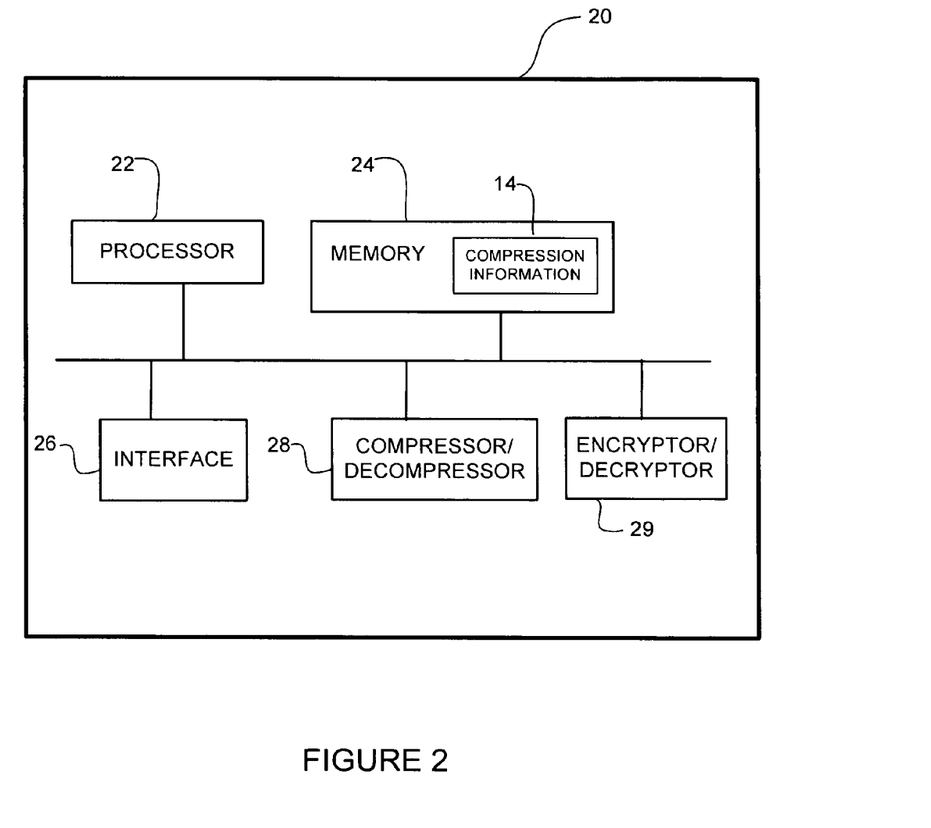
FIG. 2 depicts an example of a network device useful in implementing embodiments described herein.

FIG. 2 is a block diagram illustrating an example of a network device 20 (e.g., sender node 10, receiver node 12 in FIG. 1) that may be used to implement embodiments described herein. The network device 20 is a programmable machine that may be implemented in hardware, software, or any combination thereof. For example, one or more embodiments may be implemented in hardware with pre-processing and post-processing performed in software. The network device 20 includes a processor 22, memory 24, interface 26, compressor/decompressor 28, and encryptor/decryptor 29. Memory 24 may be a volatile memory or non-volatile storage, which stores various applications, modules, and data for execution and use by the processor 22. Memory 24 may store, for example, compression information (e.g., compression dictionary) 14 and dictionary management state.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interface 26 may comprise any number of wired or wireless interfaces (linecards, ports) for receiving signals or data or transmitting signals or data to other devices.

The compressor 28 is used to reduce the size in bits of a payload. The decompressor uses the compression information 14 transmitted in the key establishment protocol exchange to decompress received data (packets, data stream, traffic). The encryptor/decryptor 29 is used to encrypt or decrypt portions of a message.

The network device 20 may further include any suitable combination of hardware, software, algorithms, processors, devices, components, or elements operable to facilitate the capabilities described herein. For example, the network device may include an IPsec agent for managing a security association database that stores data for a plurality of IPsec security associations, or a database for storing session keys for use with DTLS.

Figure 3:
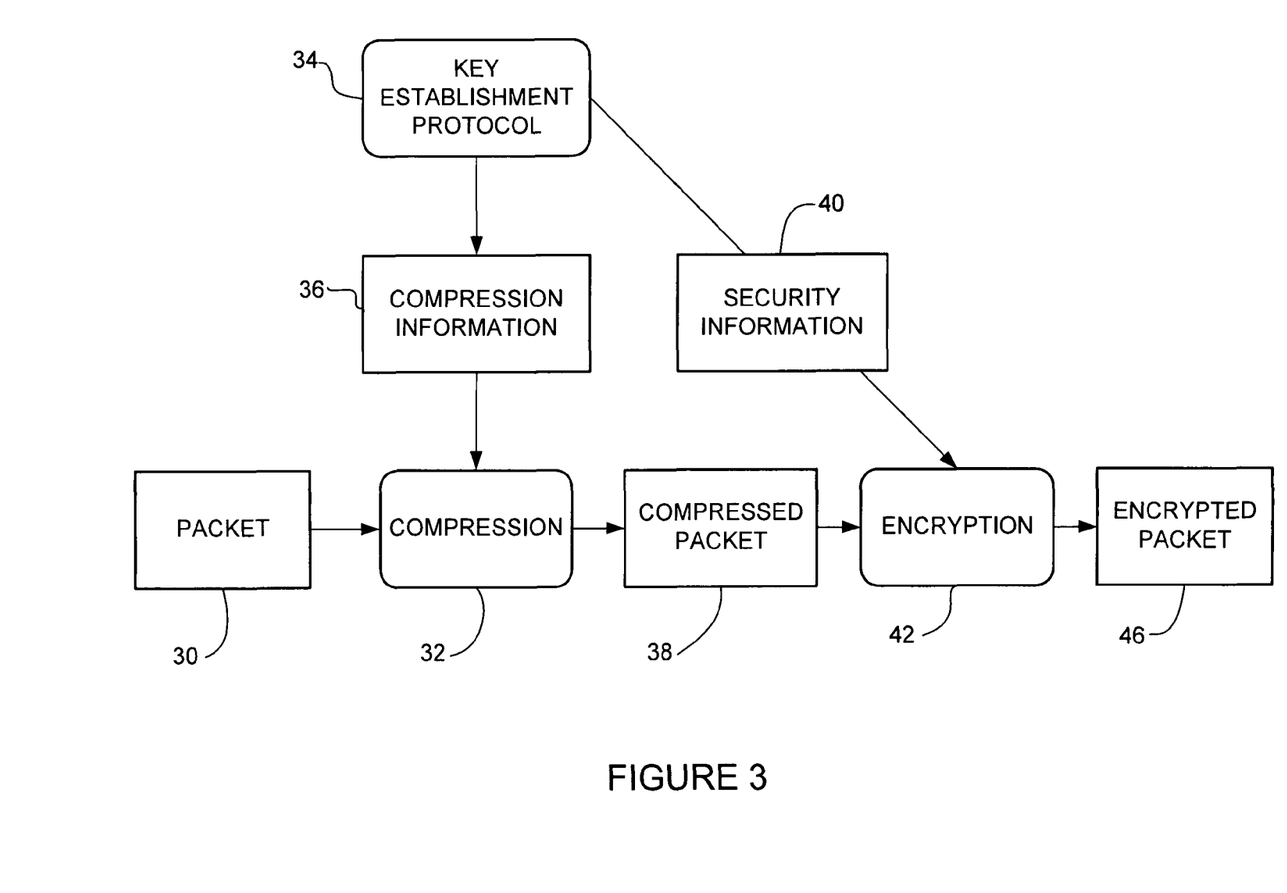
FIG. 3 is a block diagram illustrating a system for use in compression for unreliable encrypted streams, in accordance with one embodiment.
Figure 4:
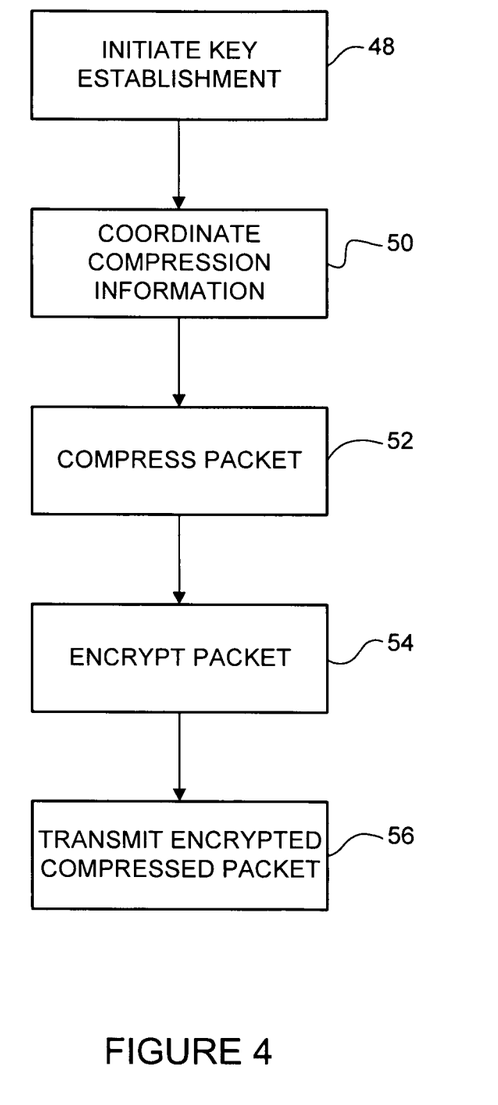
FIG. 4 is a flowchart illustrating an overview of a process for coordinating compression information and transmitting compressed packets in unreliable encrypted streams, in accordance with one embodiment.

FIGS. 3 and 4 illustrate an overview of a system and method for use in coordinating compression information for unreliable encrypted streams through the use of key establishment protocols.

FIG. 3 schematically depicts a system for use at the sender node 10 (FIG. 1). A key establishment protocol (e.g., the DTLS handshake, IKE) 34 is used to coordinate compression information (e.g., dictionary) 36 between nodes. The compression information 36 is used in compression 32 of packet 30. The key establishment protocol 34 also provides security information (e.g., security associations for ESP, session keys for DTLS) 40 for use in encryption (e.g., DTLS, ESP) 42 of compressed packet 38. The encrypted packet 46 is transmitted to the receiver node 12 using an unreliable transport.

FIG. 4 is a flowchart illustrating an overview of a process for use in compressing data for transmission in an unreliable encrypted stream, in accordance with one embodiment. At step 48, the sender node 10 initiates a key establishment protocol exchange with the receiver node 12 (FIGS. 1 and 4). Compression information is coordinated using the key establishment protocol exchange between the sender and receiver nodes 10, 12 (step 50). The sender node 10 compresses a packet carrying a record or payload using the compression information (step 52). In one embodiment, the compression algorithm operates by searching for matches between the data to be compressed and a set of strings (substrings, bit patterns) contained in a data structure referred to as a dictionary, which is maintained by the compressor. When the compressor finds a match, it substitutes a reference to the string's position in the dictionary. The system does not need to understand the details of the data being compressed. The sender node 10 encrypts the compressed packet (step 54) and transmits the encrypted compressed packet to the receiver node 12 (step 56). The receiver node 12 decrypts the received packet and uses the compression information 14 to decompress the packet.

Figure 5:
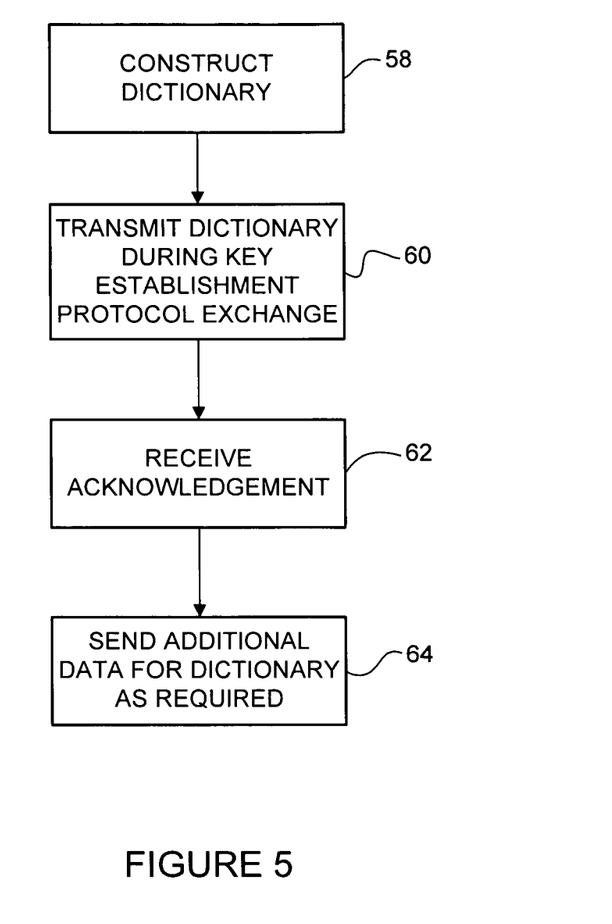
FIG. 5 is a flowchart illustrating details of a process for coordinating compression information using a compression dictionary, in accordance with one embodiment.

In one embodiment, coordinating compression information (step 50 in FIG. 4) comprises constructing a compression dictionary and transmitting the dictionary from the sender node 10 to the receiver node 12. FIG. 5 is a flowchart illustrating an overview of a process for constructing and coordinating the compression dictionary. The sender node 10 constructs the dictionary at step 58. This may include, for example, using a default dictionary on each DTLS record or ESP payload and setting the dictionary to the first record or payload sent by the application. The compression dictionary is preferably chosen dynamically and adaptively, to provide an efficient compressor regardless of the details of the traffic that is passing therethrough. Examples of methods for constructing the dictionary are described below. The sender transmits the dictionary during the key establishment phase (e.g., DTLS handshake, IKE SA (security association)) (step 60). The compression dictionary is encrypted and authenticated, since it is sensitive plaintext data. The receiver acknowledges receipt of the dictionary to ensure that the dictionary is reliably transmitted and coordinated between the sender and receiver (step 62). This allows both endpoints to stay in sync, protects confidentiality and authenticity, and ensures that the dictionary is reliably transmitted and coordinated between the sender and receiver. The sender 10 may add to the dictionary by transmitting additional data to the receiver 12 to be included in the dictionary, using the same secure and reliable transport as used to send the original dictionary (step 64).

The key establishment protocol is configured to pass data from the sender to the receiver at any time during the session. For example, IKE and IPComp can use IPCOMP Attribute and DTLS can use ClientHello and ServerHello extensions. The additional data may be appended to the existing default dictionary, in which case the dictionary would consist of multiple, concatenated DTLS records or ESP payloads (described further below). This may be used, for example, to ensure that the dictionary is representative of all types of packets flowing through the connection. In one example, the sender adds the current packet to the dictionary whenever the compression algorithm with the current dictionary is ineffective at compressing the current packet. Other more complicated methods may be used for building a default dictionary, however, it may be necessary to keep state between packets for these methods.

Each time that the sender changes the dictionary, it preferably waits until it receives an acknowledgement from the receiver/decompressor. This wait adds latency to the packet stream. Frequent changes to the dictionary can more effectively minimize the amount of traffic sent over the network, but will cause more latency. The system therefore preferably avoids frequent changes to the dictionary, to prevent excessive latency.

In an adaptive system, the dictionary may initially be empty (e.g., it may be the zero-length octet string). During the time that the dictionary is empty, the compression of each independent packet may not be very effective, because the compression algorithm will not be able to take advantage of redundancy between each individual packet and data outside of that packet. However, this behavior is reasonable because it is not possible to improve compression ratios for short sessions without hurting latency, and the compression ratios for long sessions will be relatively unaffected. For short sessions, in which few packets are sent, it is difficult to coordinate a dictionary that would provide significant compression, and any scheme that delayed sending data in an attempt to determine what dictionary should be used would introduce undesirable latency. For very long sessions, in which many packets are sent, the effect of the initial empty dictionary is minor relative to the overall compression ratio.

Compression may be considered to be sufficient when there is commonality between the first record or payload and all of the following ones. The compression algorithm may also handle the incompressible case. For example, if the data is incompressible, the algorithm may use an escape code rather than inefficiently compressing the data. In many cases, there will be headers that have significant commonality, and will compress well. A dedicated header compression such as IPHC (IP Header Compression) or ROHC (Robust Header Compression) may also be used. These provide compression and decompression of TCP, UDP and IP headers.

The sender may maintain a session-specific state that it uses to construct and manage the dictionary. The size of this dictionary-management state is preferably minimized to reserve session state resources. Since both the sender and receiver store the dictionary, it is preferred to have the sender use state to construct the dictionary. The state that is stored by the sender for managing the dictionary does not need to be shared with the receiver.

In one embodiment, the compression algorithm used to compress the data (step 52 in FIG. 4) is Deflate. Deflate is a lossless data compression algorithm that uses a combination of LZ77 (Lempel-Ziv 77) algorithm and Huffman coding. The Deflate algorithm allows for the use of a preset dictionary to make compression more efficacious for particular applications. In particular, it benefits the compression of shorter inputs. When a preset dictionary is used in the compression algorithm, the dictionary is coordinated out-of-band and is used for all packets. The dictionary is fed into the compressor, and no output is produced while the dictionary is processed, but the compressor state is updated and maintained. The data input can then be compressed. Data that is compressed with a particular preset dictionary is decompressed with the same preset dictionary so that the output of the decompressor will match the input of the compressor. It is to be understood that Deflate is only an example and that other compression algorithms may be used. For example, LZS (Lempel-Ziv-Stac) may be better suited for gateways that terminate many connections.

The following describes examples for constructing and coordinating the compression dictionary between a compressor at the sender node 10 and a decompressor at the receiver node 12. These examples are for use in making adaptive dictionary based compression schemes such as Deflate useful over network protocols with unreliable transport.

In one example, a dictionary is constructed as follows. Initially the dictionary is empty. The sender stores the first N bytes of the session, where N is the size of the buffer dedicated to managing the dictionary. After the buffer is full, the dictionary is set to this buffer. If N is large, and the session is long, this will be an effective method.

In another example, a precomputed dictionary appropriate for a specific type of data is selected. Precomputed dictionaries may be prepared for common traffic types such as HTTP (Hypertext Transfer Protocol), HTML (Hypertext Markup Language), XML (Extensible Markup Language), particular XML schema such as RSS (Really Simple Syndication), SOAP (Simple Object Access Protocol), XHTML (Extensible Hypertext Markup Language), ASN.1 (Abstract Syntax Notation One), and particular ASN.1 modules such as the C.12 Smart Meter application. The selection may be the result of an external trigger, such as an application on an end host indicating the data type to a DTLS or IPsec implementation on that host via an Application Programming Interface (API), for example. The API may provide an option by which an application can provide the entire precomputed dictionary, rather than an indication of the data type. This option is an effective way to provide good compression for specialized applications. Alternatively, the selection may include a process that inspects the flow of data through the compressor and recognizes the data type. The receiver/decompressor does not need to be aware of the precomputed dictionaries available to the sender/compressor, since it uses whatever dictionary it receives from the sender. Multiple precomputed dictionaries can be used simultaneously by concatenating the dictionaries together to form a dictionary used by the compressor.

In another example, a dictionary comprising multiple components that are logically concatenated together is constructed. Each component can be independently communicated between the sender and the receiver. As the sender/compressor finds new data that should be in the dictionary, it can be sent to the receiver/decompressor as a new dictionary component. If the sender/compressor finds that one of the existing components is no longer needed, it can delete that component. For efficiency, it may be useful to have each dictionary component reside in a separate buffer, and use compression and decompression algorithms that can operate on scatter/gather arrays (e.g., ones that support an init/update/final API). An example of a protocol that the sender and receiver can use to coordinate the dictionary is described below with respect to Deflate with context compression.

Figure 6:
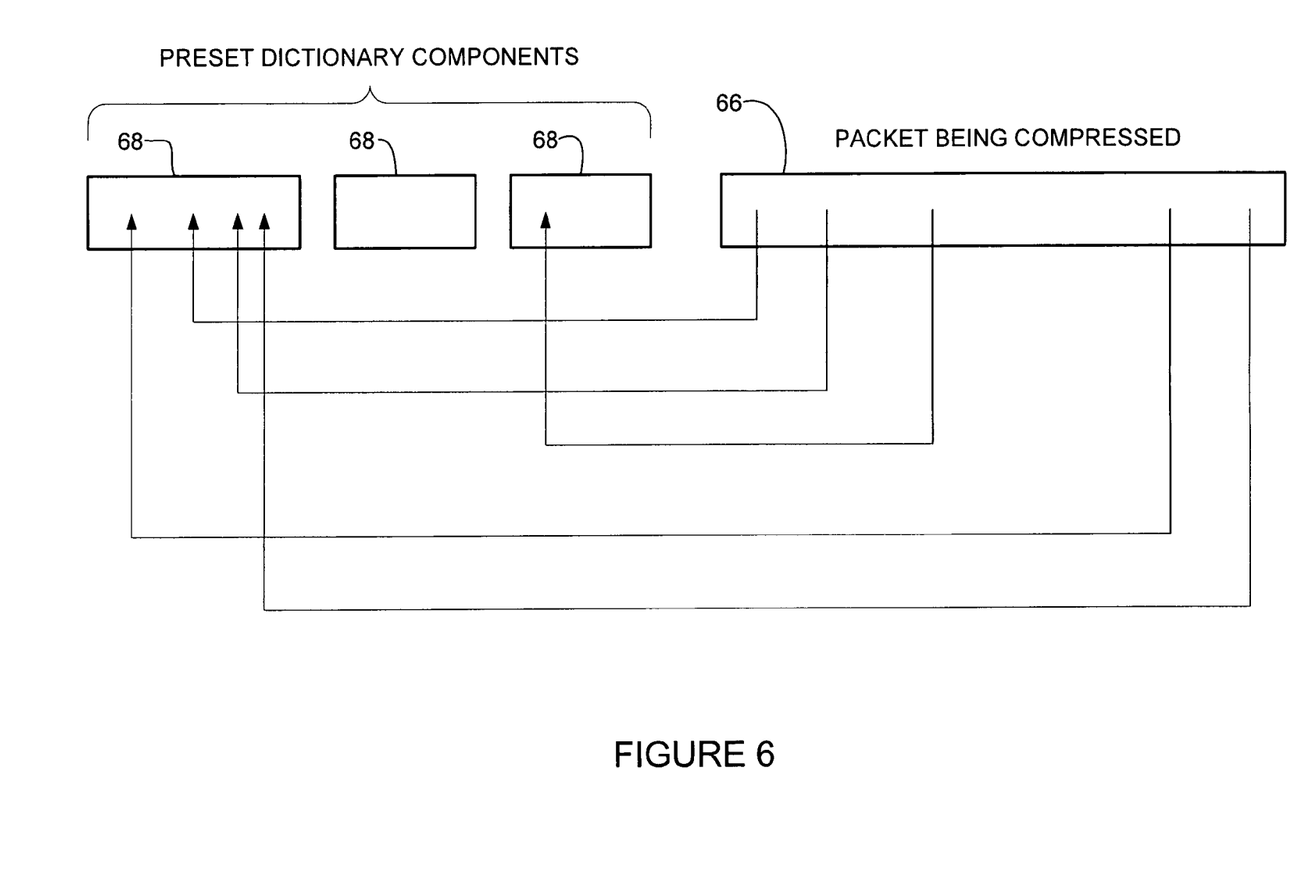
FIG. 6 illustrates an example of packet compression using a dictionary comprising multiple components.

An example of compressing a packet using a dictionary that consists of three components concatenated together is illustrated in FIG. 6. As the packet 66 is compressed, the compressor finds substrings in the packet that match substrings that appear in the preset dictionary components 68, and inserts a reference to these strings in the output instead of the literal substring value. FIG. 6 shows a match between a substring in the packet and a substring in the preset dictionary with an arrow. It should be noted that there will be matching substrings in the packet itself, but these are not shown in FIG. 6.

The following describes an example for tracking, for each packet and dictionary component, the contribution of each component to the overall compression ratio. As described below, this information can be used by the sender to manage the components in the dictionary.

The sender can keep track of the number of matches that are made between all of the packets in a session and a component. A compression algorithm can do this as a side effect. The number of matches between a packet and a component can also be determined by inspection of the output of the compressor, since that output contains a length/distance pair for each match. When a length/distance pair appears in the output and the distance backwards from that location in the output stream falls within a component, then that length/distance pair contains a match. Also, it is not difficult to determine the number of bytes that a component has contributed to the compression of a packet, because the length part of a length/distance pair is the number of bytes that the compressor avoided entering into the output stream.

Using the technique described above for each packet and each component, the sender/compressor can track the number of bytes that each component contributes to the overall compression ratio over the lifetime of the session. This information can be used by the sender to effectively manage the components in the dictionary. If a component is not contributing much, which may be caused by the session data changing from one type of data to another, the sender can discard that component in favor of another component.

It is not necessary to track the exact number of bytes that are saved by each component. It is sufficient to have a good estimate for the relative number of bytes saved. One example is to keep track of the total number of bytes in the session, and divide all of the counters by one half whenever the counter containing the total number is about to overflow.

A method for maintaining a set of dictionary components is described above. The following describes an example for setting the components by the sender.

The sender maintains a set of substrings that appear in the session data, and then collects the substrings that are most common in the data to form a dictionary component. The sender maintains a buffer that is initially empty. When a packet is being compressed, this buffer is filled with the initial data from the session. Each independent substring (or block, in Deflate terms) is tracked to determine how many times it matches a substring from the session data, and how many bytes are saved from the output stream. Each time that a new packet is compressed, that packet may contain substring matches. The substrings that match are added into the buffer if they save more bytes than a substring that appears in the block. After a brief interval, such as ten packets or 16 kilobytes, these substrings are ranked from the most-bytes-saved to the least-bytes-saved, and a dictionary component is constructed by concatenating the substrings, with the substring that saves the most bytes appearing on the right (at the end) and the substring that saves the least appearing on the left (at the beginning). This puts the most common substrings closest to the packet, thus minimizing the average size of the representation of the length/distance pairs in the compressor output. Substrings that have not saved much may be excluded from the dictionary component, with a minimal threshold used.

It may be desirable to re-use components of the Deflate algorithm. One example is to have the sender keep a buffer of candidate data for the dictionary, and for each packet, see which strings in the candidate data also appear in the packets. The following describes one example algorithm:

let P be the packet
let D be the preset dictionary
let C be the candidate data let Deflate_comp(I) be the application of the compressor to the input string I, using the current state of the compressor (the state may be considered as a global variable) for each packet:
1. Compute Deflate_comp(D||P) and copy the output of the compressor into the outgoing compressed packet, and retain the compressor state.
2. Using the same compressor state as from the end of the previous operation, compute Deflate_comp(C). If there is redundancy between C and P, then this will result in good compression of C, and will suggest that the candidate data is suitable for use in the preset dictionary.

The compressor state after processing D is preferably stored, so that D would not need to be re-compressed every time that a packet is processed.

The following describes an example of a compression method that the sender and receiver can use to coordinate the dictionary for DTLS. The method is referred to herein as 'Deflate with context compression'. This method uses Deflate with a preset dictionary. There is a separate dictionary for client to server communication, which is determined by the client, and for server to client communication, which is determined by the server.

The Deflate with context compression method may be indicated as follows:

enum{null(0), Deflate(1), DeflatewithContext(254), (255)} CompressionMethod;

In one example, the range of CompressionMethod values that is typically reserved for private use is used. The following is an example of a DTLS header extension, which is used to coordinate the dictionary between the sender and the receiver:

```
struct {
    uint8 componentNumber;
    opaque dictionaryComponent<1..2^16-1>;
    uint8 ACKofServerComponent;
} ClientCompressionContext;
struct {
    uint8 componentNumber;
    opaque dictionaryComponent<1..2^16-1>;
    uint8 ACKofClientComponent;
} ServerCompressionContext;
```

The extension data sent by the client is the ClientCompressionContext, and that sent by the server is the ServerCompression Context. The dictionaryComponent field contains an octet string that forms part of the dictionary. This field may be zero-length (e.g., it may be the empty string). The componentNumber field is an integer that is associated with the dictionaryComponent value in the same structure. A dictionary can contain multiple dictionaryComponents and the componentNumber is used to keep track of the different components. ACKofClientComponent and ACKofServerComponent acknowledge the receipt of a particular componentNumber, if the field is nonzero. If the field is zero, this structure is not acknowledging any componentNumber. In the initial ClientHello, ClientCompressionContext.ACKofServerComponent should be set to zero by the client, and is ignored by the server.

The client dictionary is the concatenation of all dictionaryComponents that have been sent by the client and acknowledged by the server. The server dictionary is the concatenation of all dictionaryComponents that have been sent by the server and acknowledged by the client.

Upon receipt of a ClientCompressionContext, the server sends a ServerCompressionContext. If the server can store the dictionaryComponent, then ServerCompressionContext.ACKofClientComponent is set to ClientCompressionContext.componentNumber. Otherwise, ServerCompressionContext.ACKofClientComponent is set to zero.

If the client sends the same componentNumber more than once, the dictionaryComponent that is sent last is used in the dictionary. The client may use this method to change the value of a dictionaryComponent, and may use this method to delete a dictionaryComponent, by sending a componentNumber that matches an earlier component along with a dictionaryComponent value of the zero-length string. The same rules hold for the server as for the client.

There are several different methods that can be used to form the dictionary. In a first method, the dictionary can be treated as a constant. In this case, the dictionaryComponent sent in the initial ClientHello and ServerHello can be used throughout the entire session. In a second method, the dictionary is treated like a stack, in which additional dictionaryComponents are added to the end of the dictionary during the session, and possibly deleted from the end of the dictionary during the session. This second method is a preferred method. In a third method, the dictionary is treated like a double-ended queue, in which dictionaryComponents can be deleted from and added to either the front or the back of the dictionary.

In order to use the Deflate with context compression, the client proposes a DeflatewithContext method in the ClientHello, and sends the ClientCompressionContext as a DTLS extension in the ClientHello. To accept the method, the server indicates the DeflatewithContext method in the ServerHello, and sends the ServerCompressionContext as a DTLS extension in the ServerHello.

The following describes an example for using Deflate with context in the IP compression protocol (IPComp). It can be applied before Encapsulating Security Payload (ESP) so that compression takes place before encryption.

The Internet Key Exchange (IKE) negotiates the use of IPComp at the same time that it negotiates the use of ESP. In the Internet IP Security Domain of Interpretation (DOI), IPComp is negotiated as the Protocol ID PROTO_IPCOMP. The compression algorithm is negotiated as one of the defined IPCOMP Transform Identifiers.

An IPCOMP_SUPPORTED notification may be included in a message containing an SA payload negotiating a CHILD_SA, which indicates a willingness by its sender to use IPComp on that SA. The data associated with this notification includes a two-octet IPComp Compression Parameter Index (CPI) followed by a one-octet transform ID optionally followed by attributes whose length and format are defined by that transform ID.

In one embodiment, the DeflatewithContext algorithm defines the Compression Context Attribute, which is sent with a CPI, as follows:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
!A!          Attribute Type       !   AF=0  Attribute Length      !
!F!                               !   AF=1  Attribute Value       !
+-+-+-+-+-+-+-+-+-+-+-+-+-+-+-+-+-+-+-+-+-+-+-+-+-+-+-+-+-+-+-+-+-
!          Component Number       !   ACK of Component Number     !
+-+-+-+-+-+-+-+-+-+-+-+-+-+-+-+-+-+-+-+-+-+-+-+-+-+-+-+-+-+-+-+-+-
!                                                                 !
!                    Dictionary Component                         !
!                       (variable length)                         !
+-+-+-+-+-+-+-+-+-+-+-+-+-+-+-+-+-+-+-+-+-+-+-+-+-+-+-+-+-+-+-+-+-
```

It is to be understood that the methods described herein for constructing and coordinating compression dictionaries are only examples and that other methods may be used, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    initiating at a sender node, a key establishment protocol exchange with a receiver node, the key establishment protocol configured to establish and maintain a compression dictionary used to coordinate compression information between the sender node and the receiver node and provide security information for use in encryption of compressed packets;
    constructing the compression dictionary;
    transmitting compression information comprising the compression dictionary from the sender node to the receiver node in the key establishment protocol exchange;
    compressing a packet using the compression information, wherein the compression dictionary is applied independently on each payload or record;
    encrypting the compressed packet; and
    transmitting the encrypted compressed packet from the sender node to the receiver node using an unreliable transport wherein packets may be lost or reordered;
    wherein the compression information is used by the receiver node in decompressing the packet received from the sender node.

2. The method of claim 1 wherein the compression dictionary comprises a default dictionary.

3. The method of claim 1 further comprising compressing the packet utilizing a compression algorithm and setting the dictionary to the first payload or record sent.

4. The method of claim 1 wherein the compression dictionary comprises a precomputed dictionary corresponding to a type of traffic.

5. The method of claim 1 wherein the compression dictionary comprises a plurality of components concatenated together.

6. The method of claim 5 further comprising tracking a number of matches between packets and each of said plurality of components.

7. The method of claim 1 further comprising transmitting additional compression information using said key establishment protocol.

8. The method of claim 1 wherein said key establishment protocol exchange comprises an Internet Key Exchange.

9. The method of claim 1 wherein said key establishment protocol exchange comprises a Datagram Transport Layer Security handshake.

10. The method of claim 1 further comprising receiving an acknowledgement from the receiver node for said compression information.

11. An apparatus comprising:
    a processor for initiating at a sender node, a key establishment protocol exchange with a receiver node, the key establishment protocol configured to establish and maintain a compression dictionary used to coordinate compression information between the sender node and the receiver node and provide security information for use in encryption of compressed packets, constructing the compression dictionary, transmitting compression information comprising the compression dictionary from the sender node to the receiver node in a key establishment protocol exchange, compressing a packet using the compression information, wherein the compression dictionary is applied independently on each payload or record, encrypting the compressed packet, and transmitting the encrypted compressed packet from the sender node to the receiver node using an unreliable transport wherein packets may be lost or reordered; and
    memory for storing said compression information;
    wherein the compression information is used by the receiver node in decompressing the packet received from the sender node.

12. The apparatus of claim 11 wherein the processor is further configured for compressing the packet utilizing a compression algorithm and setting the dictionary to the first payload or record sent.

13. The apparatus of claim 11 wherein the compression dictionary comprises a precomputed dictionary corresponding to a type of traffic.

14. The apparatus of claim 11 wherein the memory stores a dictionary management state.

15. The apparatus of claim 11 wherein the compression dictionary comprises a plurality of components concatenated together.

16. The apparatus of claim 15 wherein the processor is further configured for tracking a number of matches between packets and each of said plurality of components.

17. The apparatus of claim 15 wherein each of said plurality of components is independently transmitted to the receiver node.

18. Logic encoded on one or more tangible computer readable media for execution and when executed operable to:
    initiate at a sender node, a key establishment protocol exchange with a receiver node, the key establishment protocol configured to establish and maintain a compression dictionary used to coordinate compression information between the sender node and the receiver node and provide security information for use in encryption of compressed packets;
    construct the compression dictionary
    transmit compression information from the sender node to the receiver node in a key establishment protocol exchange;
    compress a packet using the compression information;
    encrypt the compressed packet; and
    transmit the encrypted compressed packet from the sender node to the receiver node using an unreliable transport;
    wherein the compression information is used by the receiver node in decompressing the packet received from the sender node.

* * * * *